(12) United States Patent     (10) Patent No.:   US 12,596,633 B2

Qu et al.     (45) Date of Patent:     Apr. 7, 2026

(54) VULNERABILITY DETECTION METHOD AND DEVICE

(71) Applicant: SAMSUNG ELECTRONICS CO., LTD., Suwon-si (KR)

(72) Inventors: Jianyun Qu, Shaanxi (CN); Yinxiu Guo, Shaanxi (CN); Hanbing Zhang, Shaanxi (CN); Mao Zhang, Shaanxi (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 18/117,850

(22) Filed: Mar. 6, 2023

(65) Prior Publication Data

US 2024/0028501 A1     Jan. 25, 2024

(30) Foreign Application Priority Data

Jul. 22, 2022    (CN) .......................... 202210868069.0

(51) Int. Cl.
   *G06F 11/3668*     (2025.01)
   *G06F 21/57*      (2013.01)

(52) U.S. Cl.
   CPC ...... *G06F 11/3684* (2013.01); *G06F 11/3676* (2013.01); *G06F 21/577* (2013.01)

(58) Field of Classification Search
   CPC . G06F 11/3684; G06F 11/3676; G06F 21/577
   See application file for complete search history.

(56) References Cited

U.S. PATENT DOCUMENTS

| | | | |
|---|---|---|---|
| 7,483,824 B1 | 1/2009 | Hill | |
| 7,926,114 B2 | 4/2011 | Neystadt et al. | |
| 8,336,102 B2 | 12/2012 | Neystadt et al. | |
| 10,176,085 B2 | 1/2019 | Zare et al. | |
| 10,394,694 B2 | 8/2019 | Phan et al. | |
| 11,620,129 B1 * | 4/2023 | Shimony ................ | G06F 9/545 |
| | | | 726/22 |
| 2022/0171697 A1 * | 6/2022 | Moukahal .............. | G06N 5/048 |
| 2024/0291863 A1 * | 8/2024 | Cohen ................. | H04L 63/1483 |
| 2024/0354224 A1 * | 10/2024 | Yang ...................... | G06F 21/56 |

FOREIGN PATENT DOCUMENTS

| | | | | |
|---|---|---|---|---|
| CN | 103699475 A | | 4/2014 | |
| CN | 114417348 A | * | 4/2022 | ......... G06F 11/3676 |
| WO | 2014/049104 A1 | | 4/2014 | |

* cited by examiner

*Primary Examiner* — Linglan Edwards
*Assistant Examiner* — Jacob Benedict Knackstedt
(74) *Attorney, Agent, or Firm* — Sughrue Mion, PLLC

(57) ABSTRACT

A vulnerability detection method includes obtaining a target test program including system calls and first input parameters corresponding to the system calls required for normal running of a device driver, where the system calls are arranged based on a calling relationship for the normal running of the device driver, obtaining a sequence to be inserted, wherein the sequence to be inserted comprises at least one system call, mutating the target test program based on the sequence to be inserted and second input parameters corresponding to the sequence to be inserted, and detecting a vulnerability of the device driver based on running information about the device driver obtained during execution of the mutated target test program.

17 Claims, 5 Drawing Sheets

VULNERABILITY DETECTION METHOD AND DEVICE

CROSS-REFERENCE TO RELATED APPLICATION(S)

This application is based on and claims priority under 35 U.S.C. 119(a) to China Patent Application No. 202210868069.0 filed on Jul. 22, 2022 in the China Intellectual Property Office, the disclosure of which is incorporated by reference herein in its entirety.

BACKGROUND

1. Field

The present disclosure relates to a fuzzing technology, and more particularly, to a vulnerability detection method and a vulnerability detection device.

2. Description of Related Art

At present, it can be seen from vulnerabilities exposed by a Linux system that, 43.9% of the vulnerabilities come from a device driver, and codes of the device driver accounts for about 73.4% of all codes of the Linux. Therefore, effectively finding vulnerabilities of the device driver is very important. Fuzz testing has been proposed for the device driver, which is to exploit interdependence among external interfaces of the device driver to find the vulnerabilities more effectively. However, due to a strong dependency among calling interfaces of the device driver, the device driver cannot be tested deeply by the related art fuzz testing methods. For example, in practical application scenarios, the device driver usually requires a plurality of system calls with a strict calling order to be used together, and target data to be processed by the system calls must be in a specified format (such as a video file in a specified format) for successful calling of the plurality of system calls. In such a scenario, the related art fuzz testing methods have a number of issues.

First, there is a complex dependency relationship among system calls, and a system call sequence randomly generated by the related art fuzz testing methods is difficult to meet such a dependency relationship. In other words, a calling order for the randomly generated system call sequence is uncontrollable and a probability that the calling order meets a calling order required for normal running of the device driver is very low. Thus, a deep processing logic is difficult to be covered, which results in the fuzz testing always staying in a shallow processing logic and being unable to find a deeper vulnerability.

Second, in some complex system call sequences, there are strict requirements for input parameters of each system call. If the input parameters do not meet the requirements, it would also result in the fuzz testing always staying in the shallow processing logic and being unable to find the deeper vulnerability.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

One or more example embodiments provide a vulnerability detection method and a vulnerability device, and an electronic apparatus that may detect deeper vulnerabilities in device drivers that are otherwise difficult to detect in related art fuzz testing methods.

Additional aspects will be set forth in part in the description which follows and, in part, will be apparent from the description, or may be learned by practice of the presented embodiments.

According to an aspect of an example embodiment, a vulnerability detection method may include obtaining a target test program including system calls and first input parameters corresponding to the system calls required for normal running of a device driver, where the system calls are arranged based on a calling relationship for the normal running of the device driver, obtaining a sequence to be inserted, wherein the sequence to be inserted comprises at least one system call, mutating the target test program based on the sequence to be inserted and second input parameters corresponding to the sequence to be inserted, and detecting a vulnerability of the device driver based on running information about the device driver obtained during execution of the mutated target test program.

According to an aspect of an example embodiment, a vulnerability detection device may include at least one processor configured to implement a program obtaining unit configured to obtain a target test program, wherein the target test program including system calls and first input parameters corresponding to the system calls required for normal running of a device driver, and wherein the system calls are arranged based on a calling relationship for the normal running of the device driver, a sequence obtaining unit configured to obtain a sequence to be inserted, wherein the sequence to be inserted comprises at least one system call, a mutating unit configured to mutate the target test program based on the sequence to be inserted and second input parameters corresponding to the sequence to be inserted, a detecting unit configured to detect a vulnerability of the device driver, based on running information about the device driver obtained during execution of the mutated target test program.

A non-transitory computer-readable storage medium storing instructions that, when executed by at least one processor, cause the at least one processor to obtain a target test program including system calls and first input parameters corresponding to the system calls required for normal running of a device driver, where the system calls are arranged based on a calling relationship for the normal running of the device driver, obtain a sequence to be inserted, wherein the sequence to be inserted comprises at least one system call, mutate the target test program based on the sequence to be inserted and second input parameters corresponding to the sequence to be inserted, and detect a vulnerability of the device driver based on running information about the device driver obtained during execution of the mutated target test program.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, devices, and/or systems described herein will be apparent after an understanding of the disclosure of the present disclosure. For example, the sequence of operations described herein are merely examples, and are not limited to those set forth herein, but may be changed, as will be apparent after an understanding of the disclosure of the present disclosure, with the exception of operations necessarily occurring in a certain order. In addition, descriptions of features that are known in the art may be omitted for increased clarity and conciseness.

The features described herein may be implemented in different forms, and should not to be construed as being limited to the examples described herein. Rather, the examples described herein have been provided merely to illustrate some of many possible ways of implementing the methods, devices, and/or systems described herein that will be apparent after an understanding of the disclosure of the present disclosure.

The terminology used herein is only for describing various examples, and will not to be used to limit the disclosure. The articles "a," "an," and "the" are intended to include the plural forms as well, unless the context clearly indicates otherwise. The terms "comprise", "include" and "have" specify the presence of stated features, integers, operations, components, elements, and/or combinations thereof, but do not exclude the presence or addition of one or more other features, integers, operations, components, elements, and/or combinations thereof.

Unless otherwise defined, all terms (including technical terms and scientific terms) used herein have the same meanings as commonly understood by those skilled in the art to which the present disclosure belongs after understanding the disclosure of the present disclosure. Terms (such as those defined in general dictionaries) should be interpreted as having a meaning consistent with their meaning in the context of the relevant art and in the present disclosure, and should not be interpreted in an idealized or overly formal sense unless expressly so defined herein.

In addition, in the description of the examples, detailed description of well-known relevant structures or functions will be omitted when it is deemed that such description will cause ambiguous interpretation of the present disclosure.

Figure 1:
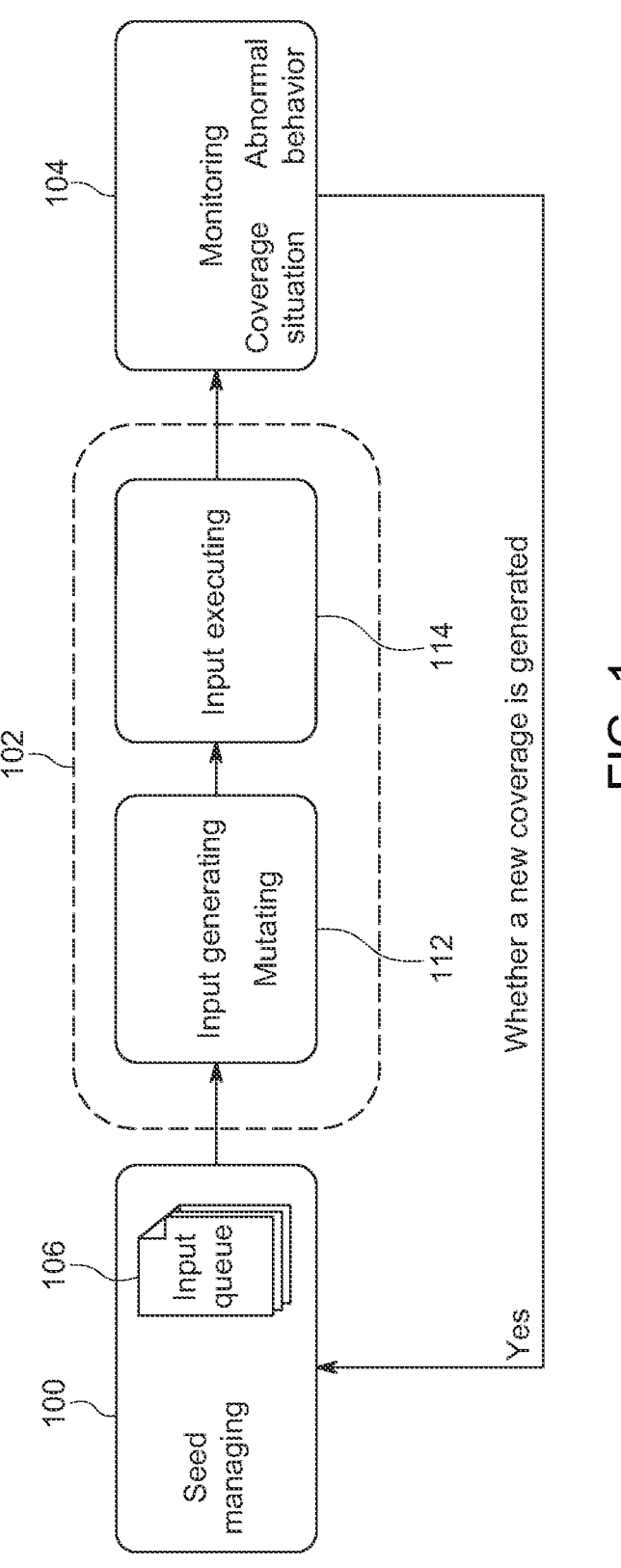
FIG. 1 is a diagram of fuzz testing according to the related art.

FIG. 1 is a diagram of fuzz testing according to the related art. In order to better understand solutions of the present disclosure, fuzz testing is briefly introduced below. As illustrated in FIG. 1, the fuzz testing may be performed with a seed managing module 100, an input generating and executing module 102, and a monitoring module 104.

The seed managing module 100 may be configured such that, if a randomly generated system call sequence is run in the device driver, and new codes are covered during the running process (i.e., there are codes being inconsistent with codes executed in a previous running process), the system call sequence would be input into a seed input queue 106 used for a next test, so as to implement a more thorough testing.

The input generating and executing module 102 may include an input generating block 112 and an input executing block 114. The input generating an executing module 102 may perform a random mutation of sequences and parameters for the seed, and execute the mutated sequences and parameters in the device driver, in order to cover more codes.

The monitoring module 104 may be configured to monitor a covering situation for codes and an abnormal behavior situation of a system.

The related art focuses on optimization of the seed managing and the generation of the system call sequence. However, the related art is unable to overcome the difficulty for the fuzz testing methods to detect deeper vulnerabilities of the device driver. Thus, provided herein is a vulnerability detection method that detects deeper vulnerabilities of device drivers.

Figure 2:
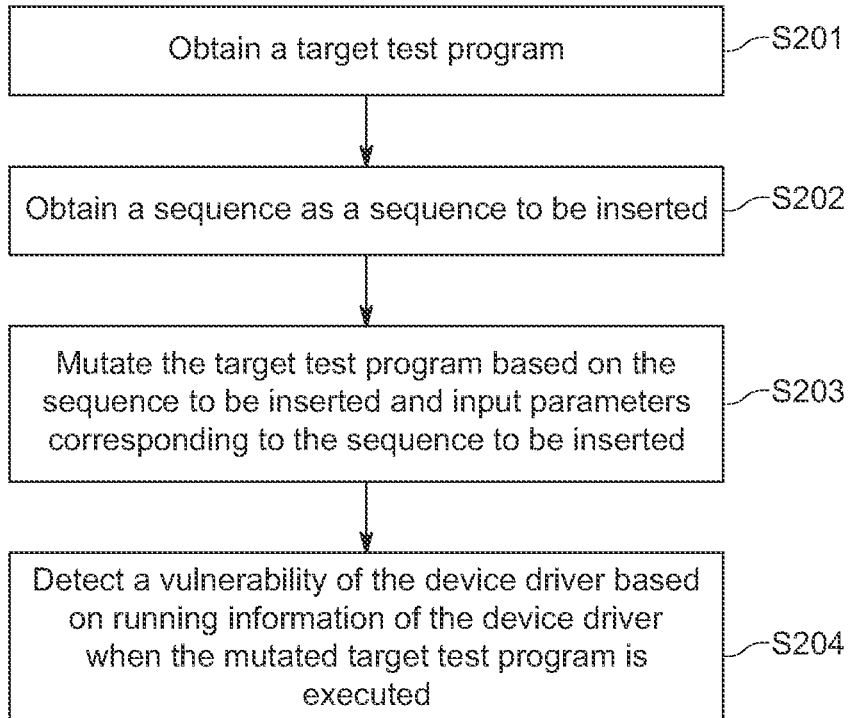
FIG. 2 is a flowchart of a vulnerability detection method according to an example embodiment of the present disclosure.

FIG. 2 is a flowchart of a vulnerability detection method according to an example embodiment of the present disclosure. Referring to FIG. 2, the vulnerability detection method may include operations S201-S204.

In operation S201, a target test program may be obtained. The target test program may include system calls and input parameters corresponding to the system calls required for normal running of a device driver. The system calls may be arranged according to a calling relationship for the normal running of the device driver. The system calls may be regarded as interfaces between application programs and an operating system, and a system call provided by the operating system may be referred to as a program interface or an application programming interface (API).

In operation 201, instead of using a system call sequence that is randomly generated for testing the device driver, example embodiments may obtain a target test program including the system calls arranged according to the calling relationship for the normal running of the device driver and the input parameters corresponding to the system calls required for the normal running of the device driver for testing the device driver, which may ensure that the device driver may reach deep codes when the target test program is executed.

In an example embodiment of the present disclosure, the target test program may be a functional test program provided for the device driver or a pre-defined test program that meets the normal running of the device driver. According to an example embodiment, the target test program may be a functional test program or a customized program set as required.

For example, the target test program may be the functional test program provided for the device driver, or may be the pre-defined test program that meets the normal running of the device driver, such as a user-level application program of an upper layer of the device driver, a simplified fuzzing model for normal sequences, or more scenario-based test programs developed based on the simplified fuzzing model. For another example, when the target test program is the functional test program, it may be a complete functional test program or a part of the complete functional test program (i.e., a subsequence), but a running order of the extracted subsequence may be the same as that in the functional test program.

In operation S202, a sequence may be obtained as a sequence to be inserted. The sequence may include at least one system call.

In an example embodiment of the present disclosure, a sequence may be obtained as the sequence to be inserted. The sequence may be obtained from a pre-configured file as the sequence to be inserted and/or from an input queue as the sequence to be inserted. According to an example embodiment, a randomly obtained sequence may be obtained from an input queue or from a configuration file, so as to provide abundant sequences to be inserted for testing.

For example, the pre-configured file may be pre-configured as required. For example, when the input queue is empty at the beginning, the sequence to be inserted may be obtained from the pre-configuration file. When the input queue is not empty, the sequence to be inserted may be obtained from the pre-configuration file or the input queue according to a preset rule. For example, the sequence to be inserted may be obtained from the pre-configured file or the input queue alternatively. Example embodiments of the present disclosure are not limited thereto. The input queue may be a set, which includes a sequence that causes the device driver to exit abnormally or a sequence that causes an emergence of codes that are inconsistent with codes executed in a previous running process.

In operation S203, the target test program may be mutated based on the sequence to be inserted and input parameters corresponding to the sequence to be inserted. Operation S203 may be used as a starting operation of testing the device driver (i.e., the operation of obtaining the target test program may be implemented in advance) and this operation may be started only when the device driver needs to be tested (i.e., this operation may occur in response to the target test program testing the device driver).

When the target test program is executed, since the target test program includes the system calls and the input parameters corresponding to the system calls required for the normal running of the device driver, and since the system calls are arranged according to the calling relationship for the normal running of the device driver, it may be guaranteed that every time the device driver is tested, the device driver may run normally (i.e., the device driver may reach deep codes every time the target test program is executed), which avoids an uncertainty of an order of the randomly generated system call sequence that makes the device driver unable to reach the deep codes. Since the target test program may ensure that the device driver runs to the deep codes, a deeper vulnerability in the device driver may be found while an existing shallow vulnerability may also not be omitted when the sequence to be inserted. The corresponding input parameters may be randomly inserted during the running of the target test program.

In an example embodiment of the present disclosure, prior to the mutating the target test program, the vulnerability detection method may further include randomly generating the input parameters corresponding to the sequence to be inserted based on parameter types required for the sequence to be inserted, or obtaining preset parameters that conform to the parameter types required for the sequence to be inserted as the input parameters corresponding to the sequence to be inserted. According to an example embodiment, the input parameters may be randomly generated or pre-defined, such that abundant input parameters may be provided. It should be noted that, whether the input parameters are randomly generated or preset parameters, their types should match parameter types required by the sequence to be inserted.

In an example embodiment of the present disclosure, mutating the target test program may include randomly inserting the sequence to be inserted and the input parameters corresponding to the sequence to be inserted into the target test program to obtain the mutated target test program. or mutating the sequence to be inserted and/or the input parameter corresponding to the sequence to be inserted, and randomly inserting the mutated sequence to be inserted and/or the mutated input parameters into the target testing program to obtain the mutated target test program. According to an example embodiment, the mutated target test program may be obtained conveniently and quickly by randomly inserting the sequence to be inserted and the input parameters corresponding to the sequence to be inserted. Additionally, first mutating the sequence to be inserted and the input parameters may further enrich test samples. It should be noted that the above-described mutating method is not limited in the present disclosure, and other mutating methods may be used as will be understood by one of ordinary skill in the art from the disclosure herein.

In operation S204, a vulnerability of the device driver may be detected based on running information about the device driver when the mutated target test program is executed.

In an example embodiment of the present disclosure, the detecting the vulnerability of the device driver may include obtaining the running information about the device driver when the mutated target test program is executed, based on the running information indicating that the device driver exits abnormally, obtaining abnormal behavior information that causes the abnormal exit of the mutated target test program, and determining the vulnerability of the device driver based on the mutated target test program and the abnormal behavior information. According to an example embodiment, the vulnerability may be determined conveniently and quickly based on the abnormal behavior information and the running information about the target test program. For example, if a device driver exits abnormally during running, it is possible to monitor whether the device driver has memory errors and other problems, such as memory out-of-bounds read and write and reference after releasing. The abnormal behavior leading to the abnormal exit may be recorded, and the vulnerability of the device driver may be analyzed in combination with collected sequence information (such as a sequence included in the mutated target test program), and a corresponding proof of concept (PoC) program is developed.

In an example embodiment of the present disclosure, after detecting a vulnerability of the device driver, the vulnerability detection method may further include, based on the running information indicating that the device driver exits abnormally, obtaining coverage information corresponding to the sequence to be inserted, where the coverage information is information about execution of codes of the device driver during running process of the mutated target test program. The vulnerability detection method may further include, based on the coverage information indicating codes among the codes of the device driver that are executed during the running process are inconsistent with codes among the codes of the device driver that are executed during a previous running process, or the abnormal behavior information that causes the device driver to exit abnormally meeting a preset condition, adding the mutated sequence to be inserted into an input queue, where the input queue may be used for a next sequence to be inserted. According to an example embodiment, the input queue may be set, and when the program exits abnormally, the mutated sequence to be inserted may be put into the input queue, so that it may be used to serve a next test of the device driver.

For example, a running state of the device driver when the mutated target test program is executed may be monitored based on the running information. When it is found that the device driver exits abnormally, the coverage information for the codes in the running process of the device driver may be collected. When the coverage information indicates that the codes executed in the running process are inconsistent with the codes executed in the previous running process (i.e., new codes in the device driver are executed), then the mutated sequence to be inserted is added to the input queue, so that it may be further mutated to test the device driver. The new codes may refer to codes that have not been executed in the previous running process. When the coverage information indicates that the codes executed in the running process are consistent with the code executed in the previous running process, the mutated sequence to be inserted may be discarded. In addition, when the device driver exits abnormally and the recorded abnormal behavior information meets the preset condition (such as the memory out-of-bounds read and write and reference after releasing), the mutated sequence to be inserted may also be added to the input queue, so that it is further mutated to test the device driver in the future.

In an example embodiment of the present disclosure, after detecting a vulnerability of the device driver, the vulnerability detection method may further include, based on the running information indicating that the device driver ends normally, obtaining coverage information corresponding to the sequence to be inserted, where the coverage information may be information about execution of codes of the device driver during the running process of the mutated target test program. The vulnerability detection method may further include, based on the coverage information indicating codes among the codes of the device driver executed during the running process are inconsistent with codes among codes of the device driver executed during a previous running process, adding the mutated sequence to be inserted into an input queue, where the input queue may be used for a next sequence to be inserted. According to an example embodiment, the input queue may be set, and when the running of the program ends normally, if there are new codes that have been executed, the mutated sequence to be inserted may bring an effective test. Then the mutated sequence to be inserted is input into the input queue, so that it may be used to serve a next test for the device driver.

For example, a running state of the device driver when the mutated target test program is executed may be monitored based on the running information, and if it is found that the running of the device driver ends normally, it may also be necessary to collect the coverage information for the codes of the device driver during the running process of the mutated target test program. When the coverage information indicates that the codes executed in the running process are inconsistent with the codes executed in the previous running process, (i.e., new codes in the device driver are executed), the mutated sequence to be inserted may be added to the input queue, so that it may be further mutated to test the device driver in the future. The new codes may refer to codes that have never been executed in the previous running process. When the coverage information indicates that the codes executed in the running process are consistent with the codes executed in the previous running process, the mutated sequence to be inserted may be discarded. When the running of the program ends normally, if new codes have been executed, the mutated sequence to be inserted may bring an effective test. The mutated sequence to be inserted may be input into the input queue, so that it may be used to serve a next test for the device driver in the future.

Figure 3:
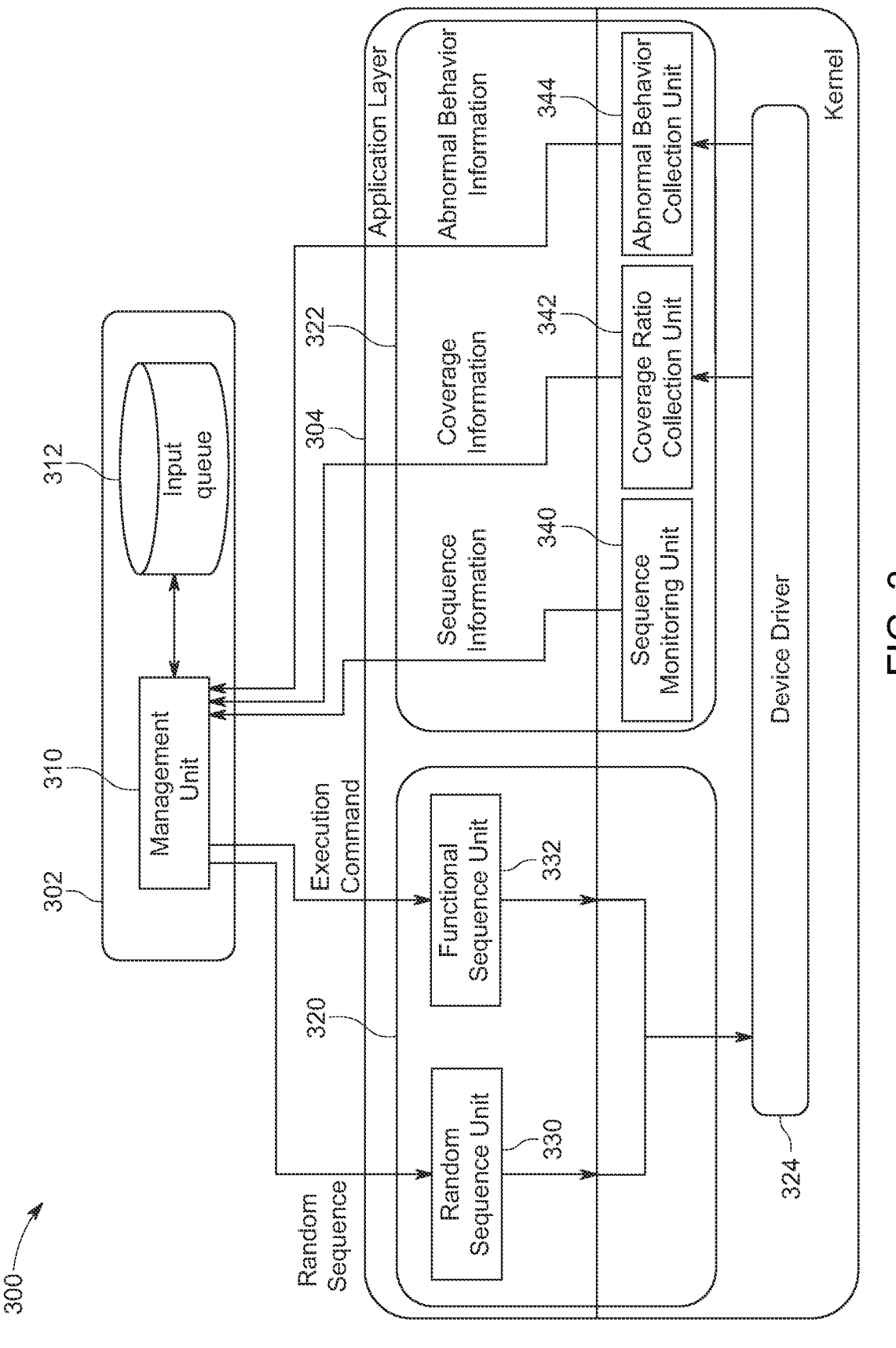
FIG. 3 is a diagram of a vulnerability detection architecture according to an example embodiment of the present disclosure.
Figure 4:
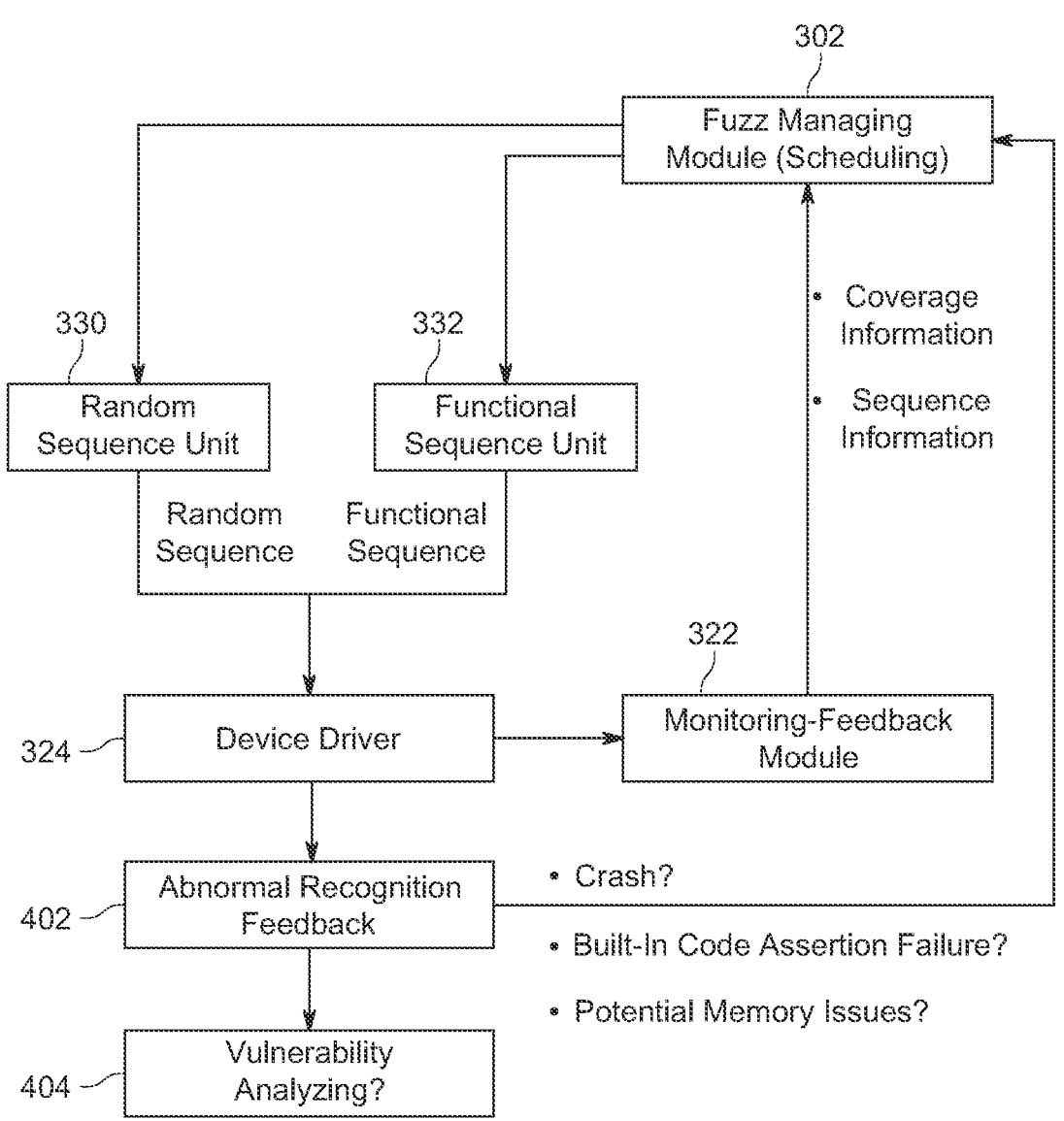
FIG. 4 is a flowchart of a vulnerability detection method according to an example embodiment of the present disclosure.

FIG. 3 is a diagram of a vulnerability detection architecture according to an example embodiment of the present disclosure. FIG. 4 is a flowchart of a vulnerability detection method according to an example embodiment of the present disclosure. The above embodiments will be discussed in detail below with reference to FIG. 3 and FIG. 4.

As illustrated in FIG. 3, the architecture 300 may include a fuzz managing module 302, and a target operating system 304:

The fuzz managing module 302 may include a management unit 310 and an input queue 312. The management unit 310 may be configured to store collected sequence information (such as a sequence included in the mutated target test program) and coverage information into the input queue, manage an execution of a random sequence unit and a functional sequence unit in the generating and executing module, and record abnormal behaviors collected by an abnormal behavior collection unit in the monitoring-feedback module so as to provide a reference for a generation of PoC.

The target operating system 304 may include a generating and executing module 320, a monitoring-feedback module 322, and a device driver 324. The generating and executing module 320 may include a random sequence unit 330 and a functional sequence unit 332. The random sequence unit 330 may be configured to mutate a sequence (i.e., a sequence randomly selected from an output queue) transmitted from the above management unit and generate corresponding input parameters according to the sequence. The functional sequence unit 332 may be configured to be scheduled by the management unit 310 to ensure the continuous running of the functional test program, such that the deep codes may be reached every time the device driver is executed. The generating and executing module 320 may include the functional test program and input parameters required for running of the functional test program.

The monitoring-feedback module 322 may include a sequence monitoring unit 340, a coverage ratio collection unit 342 and an abnormal behavior collection unit 344. The sequence monitoring unit 340 may be configured to, when the generating and executing module 320 runs in a single-core mode, directly obtain a sequence that causes an abnormality of the device driver, where the sequence may be used to generate the corresponding PoC program to verify the abnormality in the future. The sequence monitoring unit 340 may also be configured to, when the generating and executing module 320 runs in a multi-core mode, record the currently executed functional test program into which the random sequence is inserted, and when the device driver 324 has the abnormality, the random sequence may provide a reference for the subsequent development of the corresponding PoC. The coverage ratio collection unit 342 may be configured to collect coverage information for codes of the device driver during a running process of the functional test program. When the coverage information indicates that the codes executed during the running process are inconsistent with codes executed during a previous running process, the mutated random sequence may be added to the input queue, so that it may be further mutated later to test the device driver 324. When the coverage information indicates that the codes executed during the running process are consistent with the codes executed during previous running process, the mutated random sequence may be discarded. The abnormal behavior collection unit 344 may be configured to monitor whether there are memory errors and other problems when the device driver exits abnormally, such as memory out-of-bounds read and write and reference after releasing. When an abnormal behavior occurs, the mutated random sequence may be added into the input queue, so that it is further mutated in the future to test the device driver 324, and the abnormal behavior may be recorded to provide a reference for a subsequent development of PoC.

As illustrated in FIG. 4, the disclosure provides a method for constructing input of a fuzz testing by inserting random sequences and input parameters in a functional testing program, based on the architecture 300 shown in FIG. 3. By running a functional test program, the device driver 324 may be enabled to be in a depth of a normal execution and various states. The purpose is to ensure that strict verifications of the device driver 324 on input parameters, etc., are met through various complex and strict verifications including parameters, formats, operation sequences, etc., in the functional test program. Then, during the running process of the functional test program, the random sequences and corresponding input parameters may be introduced to disrupt its normal processing flow, such that more vulnerabilities may be found in deeper codes.

The fuzz managing module 302 may be configured to control an execution of the functional sequence unit 332, and may be configured to control the functional sequence unit 332 to resume the execution when an error occurs during the execution, so as to cause a functional test program in the unit run continuously.

The fuzz managing module 302 may be configured to randomly select a sequence from the input queue 312 and transmit the sequence to the random sequence unit 330. The random sequence unit 330 may be configured to mutate the sequence and input parameters and transmit the mutated sequence and input parameters to the device driver 324. The random sequence unit 330 may be configured to randomly insert the mutated sequence and input parameters into the functional test program to execute the functional test program into which a random sequence is inserted.

During execution, the monitoring-feedback module 322 (including the sequence monitoring unit 340 and the coverage ratio collection unit 342) may be configured to pass coverage information about codes and sequence information during execution of the process to the fuzz managing module 302. If the execution causes the coverage information to indicate that codes executed during the process of the execution are inconsistent with codes executed in process of a previous execution, the monitoring-feedback module 322 may be configured to add the mutated sequence in the random sequence unit 330 into the input queue 312. In operation 402, if the abnormal behavior collection unit 344 identifies an abnormal behavior during this execution (i.e., there is an abnormal behavior (such as memory errors, built-in code assertion failure, crash,\etc.) in an abnormal recognition feedback) the abnormal behavior collection unit 344 may be configured to feed the abnormal behavior back to the fuzz managing module 302, and the mutated sequence in the random sequence unit 330 may also be added to the input queue 312, such that the sequence in the input queue 312 may be called and mutated more times in the future;

If an abnormality occurs in the device driver 324 (for example, there is the abnormal behavior in the abnormal recognition feedback) a vulnerability of the device driver 324 may be analyzed in operation 404 in combination with the collected sequence information and the abnormal behavior, and the corresponding PoC program may be developed;

The operations in FIGS. 3 and 4 may be repeated until the vulnerability is found or the test stops.

Example embodiments of the present disclosure address the difficulty of utilizing random system calls and parameters to cover deep processing logics of the device driver by utilizing an existing functional test program provided by the equipment manufacturer, and by using the functional test program to provide the existing order of system calls and parameters to enable the device driver to be in an effective device driver state. Further, during the execution process of the functional test program, a wrong sequence may be randomly inserted to disrupt its normal processing flow. The "wrong sequence" may refer to either wrong input parameters or wrong calling order, which makes the original processing process easy to trigger an exception, such that deeper codes of the device driver may be covered and more vulnerabilities may be found.

Figure 5:
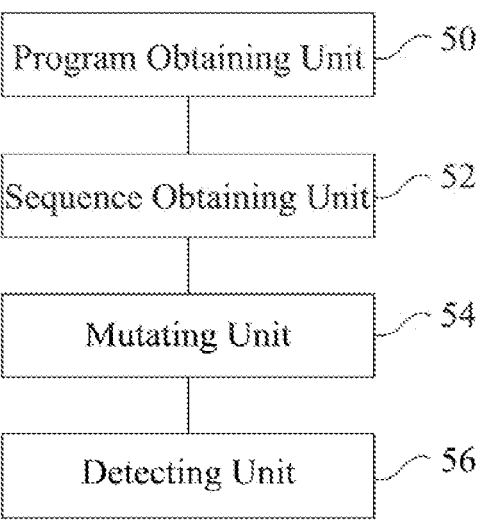
FIG. 5 is a block diagram of a vulnerability detection device according to an example embodiment of the present disclosure.

FIG. 5 is a block diagram of a vulnerability detection device according to an example embodiment of the present disclosure. A vulnerability detection device may be provided. Referring to FIG. 5, the vulnerability detection device may include a program obtaining unit 50 configured to obtain a target test program. The target test program may include system calls and input parameters corresponding to the system calls required for normal running of a device driver, and the system calls may be arranged according to a calling relationship for the normal running of the device driver. The vulnerability detection device may include a sequence obtaining unit 52 configured to obtain a sequence as a sequence to be inserted. The sequence may include at least one system call. The vulnerability detection device may include a mutating unit 54 configured to mutate the target test program based on the sequence to be inserted and input parameters corresponding to the sequence to be inserted. The vulnerability detection device may include a detecting unit 56 configured to detect a vulnerability of the device driver, based on running information about the device driver when the mutated target test program is executed.

In an example embodiment of the present disclosure, the target test program may be a functional test program provided for the device driver or a pre-defined test program that meets the normal running of the device driver.

In an example embodiment of the present disclosure, the mutating unit 54 may be configured to randomly insert the sequence to be inserted and the input parameters corresponding to the sequence to be inserted into the target test program to obtain the mutated target test program. The mutating unit 54 may be configured to mutate the sequence to be inserted and/or the input parameter corresponding to the sequence to be inserted, and randomly insert the mutated sequence to be inserted and/or the mutated input parameters into the target testing program to obtain the mutated target test program.

In an example embodiment of the present disclosure, the mutating unit 54 may be further configured to, prior to mutating the target test program based on the sequence to be inserted and the input parameters corresponding to the sequence to be inserted, randomly generate input parameters corresponding to the sequence to be inserted based on parameter types required for the sequence to be inserted, or take preset parameters that conform to the parameter types required for the sequence to be inserted as the input parameters corresponding to the sequence to be inserted.

In an example embodiment of the present disclosure, the detecting unit 56 may be further configured to, after the detecting a vulnerability of the device driver based on the running information about the device driver when the mutated target test program is executed, obtain coverage information corresponding to the sequence to be inserted based on the running information indicating that the device driver exits abnormally. The coverage information may be information about execution of codes of the device driver during running process of the mutated target test program. The detecting unit 56 may be further configured to add the mutated sequence to be inserted into an input queue based on the coverage information indicating codes among the codes of the device driver executed during the running process are inconsistent with codes among the codes of the device driver executed during a previous running process or abnormal behavior information that causes the device driver to exit abnormally meets a preset condition. The input queue may be used for next sequence to be inserted.

In an example embodiment of the present disclosure, the detecting unit 56 may be further configured to, after detecting the vulnerability of the device driver, based on the running information about the device driver when the mutated target test program is executed, obtain coverage information corresponding to the sequence to be inserted based on the running information indicating that the device driver ends normally. The coverage information may be information about execution of codes of the device driver during running process of the mutated target test program. The detecting unit 56 may be further configured to add the mutated sequence to be inserted into an input queue based on the coverage information indicating codes among the codes of the device driver executed during the running process are inconsistent with codes among the codes of the device driver executed during a previous running process. The input queue may be used for a next sequence to be inserted.

It should be understood that each unit/module in the vulnerability detection method and device according to the example embodiments of the present disclosure may be implemented as a hardware component and/or a software component. According to the processing executed by each defined unit/module, those skilled in the art may, for example, use a field-programmable gate array (FPGA) or an application-specific integrated circuit (ASIC) to implement each unit/module.

According to an aspect of the example embodiments of the present disclosure, a computer-readable storage medium may store a computer program, and, when the computer program is executed by a processor, the processor may implement the vulnerability detection method disclosed herein.

Specifically, the vulnerability detection method according to exemplary embodiments of the present disclosure may be written as a computer program, a code segment, an instruction, or any combination thereof, and recorded, stored, or fixed in one or more non-transitory computer-readable storage media or on one or more non-transitory computer-readable storage media. The computer-readable storing medium is any data storage device that may store data read out by a computer system. Examples of the computer-readable storing medium include: a read-only memory, a random-access memory, a compact disc (CD) read only memory (ROM) (CD-ROM), a magnetic tape, a floppy disk, an optical data storage apparatus and a carrier (such as data transmission through Internet through a wired or wireless transmission path).

According to an aspect of the example embodiments of the present disclosure, there is provided an electronic apparatus, where the electronic apparatus may include at least one processor, and at least one memory storing computer executable instructions. The computer executable instructions, when executed by the at least one processor, cause the at least one processor to execute the vulnerability detection method described in the present disclosure.

The electronic apparatus may broadly be a tablet computer, a smart phone, a smart watch, or any other electronic devices with necessary computing and/or processing capabilities. In one embodiment, the electronic device may include a processor, a memory, a network interface, a communication interface, etc. connected through a system bus. The processor of the electronic device may be used to provide necessary computing, processing and/or controlling capabilities. The memory of the electronic device may include a non-volatile storage medium and an internal memory. An operating system, a computer program, etc. may be stored in or on the non-volatile storage medium. The internal memory may provide an environment for execution of the operating system and the computer program in the non-volatile storage medium. The network interface and communication interface of the electronic apparatus may be used to connect and communicate with external devices through a network.

By utilizing technical solutions of the present disclosure, a vulnerability detection method and a vulnerability detection device, and an electronic apparatus are provided, which introduce a target test program including system calls arranged according to a calling relationship for normal running of a device driver and input parameters required for the normal running of the device driver. Since a calling order of the system calls of the target test program conforms to logic of the normal running of the device driver, it may be guaranteed that deep codes of the device driver are reached each time the target test program is executed. While a sequence is randomly inserted during running process of the target test program, since the target test program may ensure that the device driver runs to deep codes, a problem may be avoided in that a probability that the device driver reaching the deep codes caused by the test sequence randomly generated by the related technology is low, and a deeper vulnerability of the device driver is easier to be identified while a shallow vulnerability of the device driver is also not missed.

At least one of the components, elements, modules or units (collectively "components" in this paragraph) represented by a block in the drawings including FIGS. 1 and 3-5 may be embodied as various numbers of hardware, software and/or firmware structures that execute respective functions described above. At least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. A vulnerability detection method comprising:
obtaining a target test program comprising:
system calls, and
first input parameters corresponding to the system calls required for normal running of a device driver,
wherein the system calls are arranged based on a calling relationship for the normal running of the device driver;
obtaining a sequence to be inserted, wherein the sequence to be inserted comprises at least one system call;
mutating the target test program based on the sequence to be inserted and second input parameters corresponding to the sequence to be inserted by randomly inserting the sequence to be inserted and/or the second input parameters into the target test program; and
detecting a vulnerability of the device driver based on running information about the device driver obtained during execution of the mutated target test program,
wherein, prior to the mutating the target test program, the method further comprises:
randomly generating the second input parameters corresponding to the sequence to be inserted based on parameter types required for the sequence to be inserted; or
obtaining preset parameters that conform to the parameter types required for the sequence to be inserted as the second input parameters corresponding to the sequence to be inserted.

2. The vulnerability detection method of claim 1, wherein the target test program comprises:
a functional test program provided for the device driver; or
a pre-defined test program that meets the normal running of the device driver.

3. The vulnerability detection method of claim 1, wherein the mutating the target test program comprises:
obtaining the mutated target test program by:
mutating the sequence to be inserted and/or the second input parameters corresponding to the sequence to be inserted, and
randomly inserting the mutated sequence to be inserted and/or the mutated second input parameters into the target test program.

4. The vulnerability detection method of claim 1, wherein, after the detecting the vulnerability of the device driver, the method further comprises:
based on the running information indicating that the device driver exits abnormally, obtaining coverage information corresponding to the sequence to be inserted, wherein the coverage information comprises information about execution of codes of the device driver during the execution of the mutated target test program.

5. The vulnerability detection method of claim 4, wherein, after the detecting the vulnerability of the device driver, the method further comprises:

based on the coverage information indicating first codes among the codes of the device driver executed during the execution of the mutated target test program being inconsistent with second codes among the codes of the device driver executed during a previous execution of a previous target test program, or based on abnormal behavior information meeting a preset condition, adding the mutated sequence to be inserted into an input queue, wherein the input queue is configured to be used for a next sequence to be inserted.

6. The vulnerability detection method of claim 1, wherein, after the detecting the vulnerability of the device driver, the method further comprises:
based on the running information indicating that the device driver ends normally, obtaining coverage information corresponding to the sequence to be inserted, wherein the coverage information comprises information about execution of codes of the device driver during executing of the mutated target test program.

7. The vulnerability detection method of claim 6, wherein, after the detecting the vulnerability of the device driver, the method further comprises:
based on the coverage information indicating first codes among the codes of the device driver executed during the execution of the mutated target test program being inconsistent with second codes among the codes of the device driver executed during a previous execution of a previous target test program, adding the mutated sequence to be inserted into an input queue, wherein the input queue is configured to be used for a next sequence to be inserted.

8. A vulnerability detection device comprising at least one processor configured to implement:
a program obtaining unit configured to obtain a target test program, wherein the target test program comprises system calls and first input parameters corresponding to the system calls required for normal running of a device driver, and the system calls are arranged based on a calling relationship for the normal running of the device driver;
a sequence obtaining unit configured to obtain a sequence to be inserted, wherein the sequence to be inserted comprises at least one system call;
a mutating unit configured to mutate the target test program based on the sequence to be inserted and second input parameters corresponding to the sequence to be inserted by randomly inserting the sequence to be inserted and/or the second input parameters into the target test program; and
a detecting unit configured to detect a vulnerability of the device driver, based on running information about the device driver obtained during execution of the mutated target test program,
wherein, prior to the mutating the target test program, the mutating unit is further configured to:
randomly generate the second input parameters corresponding to the sequence to be inserted based on parameter types required for the sequence to be inserted; or
obtain preset parameters that conform to the parameter types required for the sequence to be inserted as the second input parameters corresponding to the sequence to be inserted.

9. The vulnerability detection device of claim 8, wherein the target test program comprises:
a functional test program provided for the device driver; or a pre-defined test program that meets the normal running of the device driver.

10. The vulnerability detection device of claim 8, wherein the mutating unit is further configured to mutate the target test program by:

obtaining the mutated target test program by:

mutating the sequence to be inserted and/or the second input parameters corresponding to the sequence to be inserted, and randomly inserting the mutated sequence to be inserted and/or the mutated second input parameters into the target test program.

11. The vulnerability detection device of claim 8, wherein, after the detecting the vulnerability of the device driver, the detecting unit is further configured to:

based on the running information indicating that the device driver exits abnormally, obtain coverage information corresponding to the sequence to be inserted, wherein the coverage information comprises information about execution of codes of the device driver during the execution of the mutated target test program.

12. The vulnerability detection device of claim 11, wherein, after the detecting the vulnerability of the device driver, the detecting unit is further configured to:

based on the coverage information indicating first codes among the codes of the device driver executed during the execution of the mutated target test program being inconsistent with second codes among the codes of the device driver executed during a previous execution of a previous target test program, or based on abnormal behavior information meeting a preset condition, add the mutated sequence to be inserted into an input queue, wherein the input queue is configured to be used for a next sequence to be inserted.

13. The vulnerability detection device of claim 8, wherein, after the detecting the vulnerability of the device driver, the detecting unit is further configured to:

based on the running information indicating that the device driver ends normally, obtain coverage information corresponding to the sequence to be inserted, wherein the coverage information comprises information about execution of codes of the device driver during executing of the mutated target test program.

14. The vulnerability detection device of claim 13, wherein, after the detecting the vulnerability of the device driver, the detecting unit is further configured to:

based on the coverage information indicating first codes among the codes of the device driver executed during the execution of the mutated target test program being inconsistent with second codes among the codes of the device driver executed during a previous execution of a previous target test program, add the mutated sequence to be inserted into an input queue, wherein the input queue is configured to be used for a next sequence to be inserted.

15. A non-transitory computer-readable storage medium storing instructions that, when executed by at least one processor, cause the at least one processor to:

obtain a target test program comprising:

system calls, and first input parameters corresponding to the system calls required for normal running of a device driver, wherein the system calls are arranged based on a calling relationship for the normal running of the device driver;

obtain a sequence to be inserted, wherein the sequence to be inserted comprises at least one system call;

mutate the target test program based on the sequence to be inserted and second input parameters corresponding to the sequence to be inserted by randomly inserting the sequence to be inserted and/or the second input parameters into the target test program; and detect a vulnerability of the device driver based on running information about the device driver obtained during execution of the mutated target test program, wherein the instructions, when executed, further cause the at least one processor to, prior to mutating the target test program:

randomly generate the second input parameters corresponding to the sequence to be inserted based on parameter types required for the sequence to be inserted; or obtain preset parameters that conform to the parameter types required for the sequence to be inserted as the second input parameters corresponding to the sequence to be inserted.

16. The storage medium of claim 15, wherein the target test program comprises:

a functional test program provided for the device driver; or a pre-defined test program that meets the normal running of the device driver.

17. The storage medium of claim 15, wherein the instructions, when executed, cause the at least one processor to mutate the target test program by:

obtain the mutated target test program by:

mutating the sequence to be inserted and/or the second input parameters corresponding to the sequence to be inserted, and randomly inserting the mutated sequence to be inserted and/or the mutated second input parameters into the target test program.

* * * * *